US010563515B2

(12) United States Patent
Yokoyama et al.

(10) Patent No.: US 10,563,515 B2
(45) Date of Patent: Feb. 18, 2020

(54) TURBINE IMPELLER AND VARIABLE GEOMETRY TURBINE

(71) Applicant: MITSUBISHI HEAVY INDUSTRIES ENGINE & TURBOCHARGER, LTD., Sagamihara-shi, Kanagawa (JP)

(72) Inventors: Takao Yokoyama, Tokyo (JP); Seiichi Ibaraki, Tokyo (JP); Toyotaka Yoshida, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 214 days.

(21) Appl. No.: 15/538,051

(22) PCT Filed: Mar. 26, 2015

(86) PCT No.: PCT/JP2015/059419
§ 371 (c)(1),
(2) Date: Jun. 20, 2017

(87) PCT Pub. No.: WO2016/151849
PCT Pub. Date: Sep. 29, 2016

(65) Prior Publication Data
US 2018/0010464 A1    Jan. 11, 2018

(51) Int. Cl.
*F01D 5/00* (2006.01)
*F01D 5/14* (2006.01)
*F01D 17/14* (2006.01)

(52) U.S. Cl.
CPC ........... *F01D 5/146* (2013.01); *F01D 17/146* (2013.01); *F05D 2220/40* (2013.01)

(58) Field of Classification Search
CPC ... F01D 5/04; F01D 5/14; F01D 5/146; F01D 17/14; F01D 17/146; F01D 1/06;
(Continued)

(56) References Cited

U.S. PATENT DOCUMENTS

| 4,904,158 A * | 2/1990 | Kun ........................ F01D 5/048 415/1 |
| 8,517,664 B2 * | 8/2013 | Sun ........................ F02B 47/08 415/126 |

(Continued)

FOREIGN PATENT DOCUMENTS

| CN | 101915126 A | 12/2010 |
| CN | 104314863 A | 1/2015 |

(Continued)

OTHER PUBLICATIONS

International Prelminary Report on Patentability and Written Opinion of the International Searching Authority (Forms PCT/IB/338, PCT/IB/373, PCT/ISA/237 and PCT/IB/326) issued in International Application No. PCT/JP2015/059419 dated Oct. 5, 2017, together with an English translation.

(Continued)

*Primary Examiner* — Hieu T Vo
*Assistant Examiner* — Sherman D Manley
(74) *Attorney, Agent, or Firm* — Birch, Stewart, Kolasch & Birch, LLP (57) ABSTRACT

A turbine impeller includes: a hub portion coupled to an end of a rotational shaft; a plurality of main blades disposed at intervals on a peripheral surface of the hub portion; and a short blade disposed between two adjacent main blades among the plurality of main blades. An inter-blade flow channel is formed between the two adjacent main blades so that a fluid flows through the inter-blade flow channel from an outer side toward an inner side of the turbine impeller in a radial direction. In a meridional plane, a hub-side end of a leading edge of the short blade is disposed on an inner side, in the radial direction, of a hub-side end of a leading edge of the main blade.

9 Claims, 11 Drawing Sheets

(58) Field of Classification Search
CPC . F04D 29/30; F04D 23/00; F02C 9/22; F05D 2220/40; Y02T 10/144
See application file for complete search history.

(56) References Cited

U.S. PATENT DOCUMENTS

| | | | | |
|---|---|---|---|---|
| 8,608,433 | B2* | 12/2013 | Lombard | F01D 5/048 415/157 |
| 2004/0213661 | A1* | 10/2004 | Sekularac | F01D 5/048 415/1 |
| 2007/0231141 | A1* | 10/2007 | Chaing | F01D 5/048 416/185 |
| 2009/0297344 | A1* | 12/2009 | Hill | F01D 5/048 415/208.1 |
| 2011/0064583 | A1* | 3/2011 | Billotey | F01D 5/141 416/234 |
| 2011/0091323 | A1* | 4/2011 | Koike | F04D 29/284 416/175 |
| 2015/0218949 | A1* | 8/2015 | Higashimori | F01D 5/048 415/205 |

FOREIGN PATENT DOCUMENTS

| | | |
|---|---|---|
| DE | 3908285 C1 | 6/1990 |
| JP | 2013-11260 A | 1/2013 |
| JP | 2013-15035 A | 1/2013 |
| WO | WO 2006/117072 A1 | 11/2006 |
| WO | WO 2014/038054 A1 | 3/2014 |

OTHER PUBLICATIONS

International Search Report and Written Opinion of the International Searching Authority (Forms PCT/ISA/210, PCT/ISA/220 and PCT/ISA/237) issued in International Application No. PCT/JP2015/059419 dated Jun. 30, 2015.
Office Action dated Aug. 9, 2018 issued in the corresponding CN Application No. 201580071129.4 with a machine English Translation.

* cited by examiner

FIG. 9A
LOW FLOW RATE

FIG. 9B
HIGH FLOW RATE

TURBINE IMPELLER AND VARIABLE GEOMETRY TURBINE

TECHNICAL FIELD

The present disclosure relates to a turbine rotor blade and a variable geometry turbine.

BACKGROUND ART

In recent years, downsizing of engines equipped with a turbocharger has become common in the field of automobile engines, as a technique to reduce fuel consumption. Furthermore, in recent years, evaluation of the fuel economy performance of an automobile includes more test results obtained during extremely low-speed operation and acceleration of the engine, and thus there is an increasing need toward turbochargers that can exert a high turbine efficiency while the engine operates at an extremely low-speed. Thus, variable geometry turbochargers are becoming increasingly popular, which include a variable nozzle mechanism for controlling a flow direction of a fluid that flows toward a turbine impeller (turbine wheel). In this context, a turbine impeller are required to exert a high turbine efficiency in a wide operational range from extremely low-speed engine operation to high-speed engine operation, and to have a high transient responsiveness.

Generally, to improve the performance of a turbine impeller during low-speed operation of an engine, it is necessary to set the blade height and the throat area of the turbine impeller suitably for operation at a low flow rate. On the other hand, however, this leads to a decrease in the turbine efficiency during operation at a high flow rate.

CITATION LIST

Patent Literature

WO2014/038054A

SUMMARY

Problems to be Solved

Patent Document 1 discloses a mixed flow turbine having two scroll flow paths on the hub side and the shroud side, further provided with an intermediate blade having a middle height at a hub-side section having an impulse blade turbine property, whereby the impulse blade turbine property is improved and an inertia moment of the entire turbine impeller is reduced, for improving both of the turbine efficiency and the transient responsiveness. However, with the mixed flow turbine of Patent Document 1, the inertia moment is not reduced sufficiently, and thus the transient responsiveness cannot be fully improved.

At least one embodiment of the present invention was made in view of the above issue, and an object is to provide a turbine impeller and a variable geometry turbine including the turbine impeller, whereby the turbine efficiency at a low flow rate is improved and the transient responsiveness is improved.

Solution to the Problems (1) A turbine impeller according to at least one embodiment of the present invention comprises: a hub portion coupled to an end of a rotational shaft; a plurality of main blades disposed at intervals on a peripheral surface of the hub portion; and a short blade disposed between two adjacent main blades among the plurality of main blades. An inter-blade flow channel is formed between the two adjacent main blades so that a fluid flows through the inter-blade flow channel from an outer side toward an inner side of the turbine impeller in a radial direction. In a meridional plane, a hub-side end of a leading edge of the short blade is disposed on an inner side, in the radial direction, of a hub-side end of a leading edge of the main blade.

A fluid that flows into a turbine impeller flows diagonally with respect to the leading edge of the main blade, from the outer side toward the inner side, in the radial direction, of the turbine impeller. Thus, the fluid flowing into the turbine impeller collides with the leading edge of the main blade and separates, thus causing loss. Further, according to findings of the present inventors, separation due to collision between the fluid flowing into the turbine impeller with the leading edge of the main blade provokes a secondary flow having a swirl component inside the inter-blade flow channel, and this secondary flow also generates loss.

Further, according to findings of the present inventors, the short blades are disposed between two adjacent main blades so that the position of the leading edges of the short blades in the radial direction is the same as the position of the leading edges of the main blades, and thereby it is possible to suppress separation at the leading edges of the main blades and at the leading edges of the short blades. However, the effect to reduce loss due to the secondary flow flowing through the inter-blade flow channel is limited. This is because, the secondary flow flowing between a main blade and a surface (e.g. suction surface) of a short blade collides with the secondary flow flowing between an adjacent main blade and another surface (e.g. pressure surface) of the short blade, at the downstream side of the short blade in the inter-blade flow channel, thus generating loss. Further, with the short blades disposed on the outer section of the turbine impeller in the radial direction, the inertia moment increases, and the transient responsiveness deteriorates.

In contrast, the turbine impeller according to the above (1) includes a short blade disposed between two adjacent main blades, and the hub-side end of the leading edge of the short blade is disposed on the inner side, in the radial direction, of the hub-side end of the leading edge of the main blade, in a meridional plane. According to findings of the present inventors, with this configuration, it is possible to reduce loss due to the secondary flows that flow through the inter-blade flow channel. Further, with the short blades disposed on the inner section of the turbine impeller in the radial direction, it is possible to suppress an increase in the inertia moment due to provision of the short blades.

Moreover, with the turbine impeller according to the above (1), the short blades with the above configuration are provided, and thereby it is possible to reduce the number of main blades compared to a turbine impeller that has no short blade, and to a turbine impeller having short blades disposed on the outer section in the radial direction. Accordingly, while greater loss is generated due to separation at the leading edge of each main blade, it is possible to suppress loss due to separation at the leading edges of the main blades for the turbine impeller as a whole. Further, the inertia moment can be reduced by reducing the number of the main blades.

(2) In some embodiments, in the turbine impeller according to the above (2), in the meridional plane, a hub-side end of a trailing edge of the short blade is positioned on a same position, in an axial direction, as a hub-side end of a trailing edge of the main blade, or positioned downstream, in a flow direction of the fluid, of the hub-side end of the trailing edge of the main blade.

According the embodiment described in the above (2), it is possible to prevent collision, inside the inter-blade flow channel, of the secondary flow flowing between the main blade and a surface of the short blade and the secondary flow flowing between an adjacent main blade and another surface of the short blade. Accordingly, it is possible to reduce the loss due to the secondary flows that flow through the inter-blade flow channel.

(3) In some embodiments, in the turbine impeller according to the above (2), the hub-side end of the leading edge of the short blade is positioned in a region which satisfies $0.30<Lh2/Lh1<0.89$, provided that $Lh1$ is a distance from the hub-side end of the leading edge of the main blade to the hub-side end of the trailing edge of the main blade in the meridional plane, and $Lh2$ is a distance from the hub-side end of the leading edge of the main blade to the hub-side end of the leading edge of the short blade in the meridional plane.

According to findings of the present inventors, if the hub-side end of the leading edge of the main blade and the hub-side end of the leading edge of the short blade are at a too small distance, a separation flow caused by collision with the leading edge of the main blade hits the leading edge of the short blade and generates loss. Further, the inertia moment also increases. On the other hand, if the distance between the hub-side end of the leading edge of the main blade and the hub-side end of the leading edge of the short blade is too great, the loss due to the secondary flows through the inter-blade flow channel cannot be sufficiently suppressed. The present inventors found that, with the hub-side end of the leading edge of the short blade being disposed in a region satisfying an expression $0.30<Lh2/Lh1<0.89$ as in the embodiment described in the above (3), it is possible to reduce the loss due to the secondary flows flowing through the inter-blade flow channel, and to improve the turbine efficiency by at least a predetermined amount.

(4) In some embodiments, in the turbine impeller according to the above (3), the hub-side end of the leading edge of the short blade is positioned in a region which satisfies $0.52<Lh2/Lh1<0.84$.

The present inventors found that, with the hub-side end of the leading edge of the short blade being disposed in a region satisfying an expression $0.52<Lh2/Lh1<0.84$ as in the embodiment described in the above (4), it is possible to further improve the turbine efficiency.

(5) In some embodiments, in the turbine impeller described in the above (4), the hub-side end of the leading edge of the short blade is positioned in a region which satisfies $0.60<Lh2/Lh1<0.80$.

The present inventors found that, with the hub-side end of the leading edge of the short blade being disposed in a region satisfying an expression $0.60<Lh2/Lh1<0.80$ as in the embodiment described in the above (5), it is possible to improve the turbine efficiency even further.

(6) In some embodiments, in the turbine impeller described in any one of the above (2) to (5), the hub-side end of the trailing edge of the short blade is positioned downstream, in the flow direction of the fluid, of the hub-side end of the trailing edge of the main blade.

According to the embodiment described in the above (6), the hub-side end of the trailing edge of the short blade is disposed downstream, with respect to the flow direction of the fluid, of the hub-side end of the trailing edge of the main blade. In other words, the hub-side end of the trailing edge of the short blade is disposed closer to the tip of the hub portion in the axial direction than the hub-side end of the trailing edge of the main blade, in a meridional plane. With this configuration, it is possible to shift the position of collision between the secondary flow flowing between the main blade and a surface of the short blade and the secondary flow flowing between an adjacent main blade and another surface of the short blade, to the downstream side away from the trailing edge of the main blade. Accordingly, it is possible to further suppress the loss due to the secondary flows that flow through the inter-blade flow channel.

(7) In some embodiments, in the turbine impeller according to the above (6), a shroud-side end of the trailing edge of the short blade is positioned on the trailing edge of the main blade in the meridional plane.

The effect in the embodiment described in the above (6), which is to shift the position of collision between secondary flow flowing between the main blade and a surface of the short blade and the secondary flow flowing between an adjacent main blade and another surface of the short blade to the downstream side away from the trailing edge of the main blade, is greater at the hub-side portion than at the shroud-side portion of the short blade. Thus, with the embodiment described in the above (7), compared to a case in which the entire trailing edge of the short blade is disposed downstream of the trailing edge of the main blade, it is possible to reduce the size of the short blade and thereby reduce the inertia moment, while reducing the loss due to the secondary flows.

(8) In some embodiments, in the turbine impeller according to any one of the above (1) to (7), a blade height of the short blade is lower than a blade height of the main blade.

As described above, the effect of providing the short blade to reduce the loss due to the secondary flows flowing through the inter-blade flow channel is greater at the hub-side portion than at the shroud-side portion of the short blade. Thus, with the embodiment described in the above (8), the blade height of the short blade is smaller than the blade height of the main blade, and thereby it is possible to reduce the inertia moment while reducing the loss due to the secondary flows.

(9) A variable geometry turbine according to at least one embodiment of the present invention comprises: the turbine according to any one of the above (1) to (8); a turbine housing for housing the turbine impeller; and a variable nozzle mechanism for controlling a flow direction of a fluid which flows toward the turbine impeller.

In a variable geometry turbine including a variable nozzle mechanism for controlling a flow direction of a fluid that flows toward a turbine impeller, the flow directions of the fluid flowing into the turbine impeller form smaller angles with the tangent direction of the turbine impeller when the flow rate is low than when the flow rate is high. Thus, the loss due to separation caused by collision of the fluid flowing into the turbine impeller with the leading edge of the main blade has a greater effect when the flow rate is low than when the flow rate is high. Thus, with the embodiment described in the above (9), for having the above described turbine impeller, it is possible to improve the turbine efficiency when the flow rate is low.

Advantageous Effects

According to at least one embodiment of the present invention, it is possible to provide a turbine impeller and a variable geometry turbine including the turbine impeller, whereby the turbine efficiency at a low flow rate is improved and the transient responsiveness is improved.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Further, in the description below, some the same features are associated with the same reference numerals and not described again.

Further, in the following description of the comparative examples, some o of the same features are associated with the same reference numerals and an apostrophe suffixed there to, and not described again.

Figure 1:
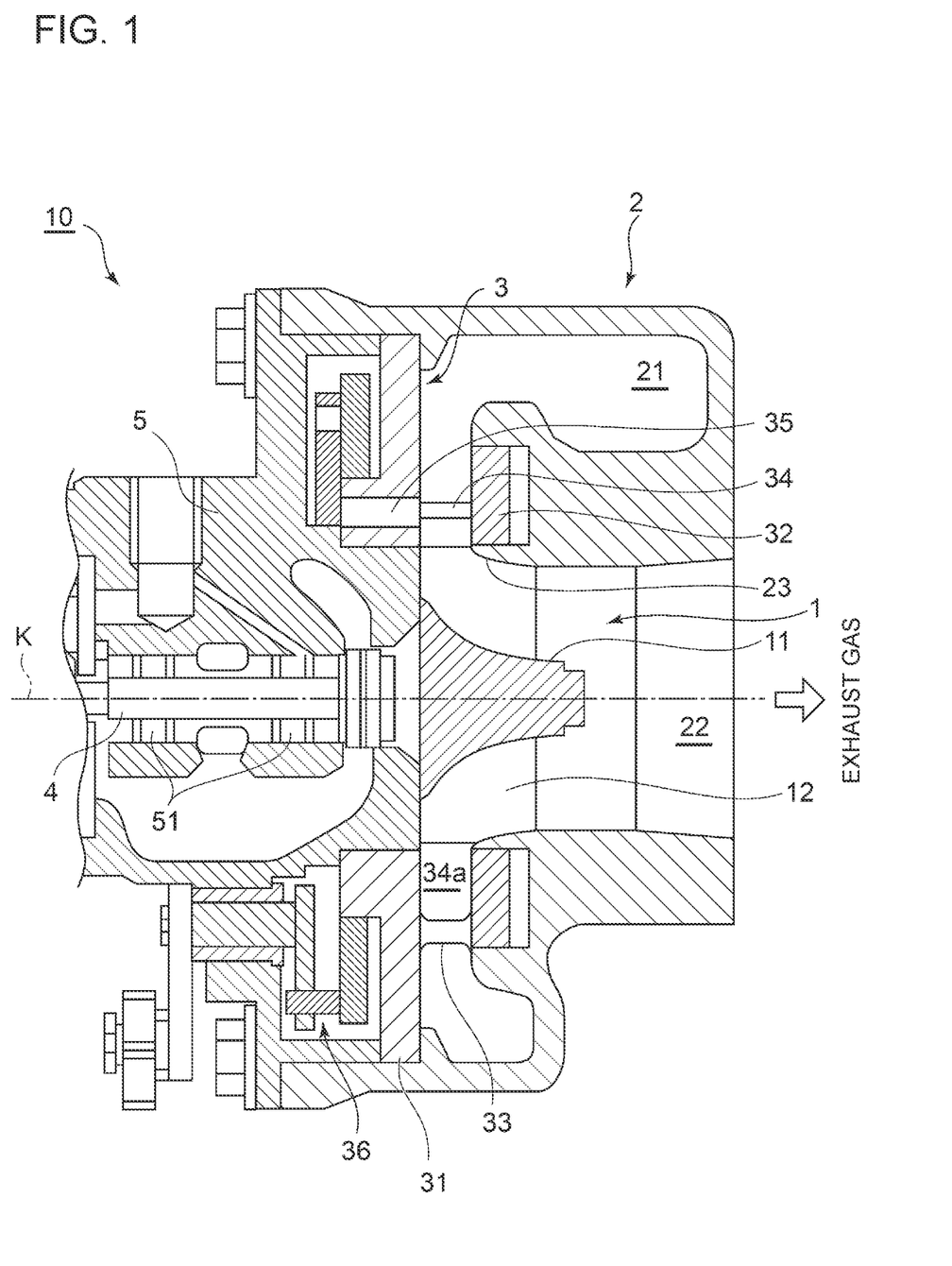
FIG. 1 is a cross-sectional view of a variable geometry turbine according to an embodiment of the present invention.

FIG. 1 is a schematic cross-sectional view of a variable geometry turbine according to an embodiment of the present invention.

As depicted in FIG. 1, a variable geometry turbine 10 according to an embodiment of the present invention includes a turbine impeller 1, a turbine housing 2 housing the turbine impeller 1, and a variable nozzle mechanism 3 for controlling a flow direction of a fluid (e.g. exhaust gas discharged from a non-depicted engine) that flows toward the turbine impeller 1.

Figure 2A:
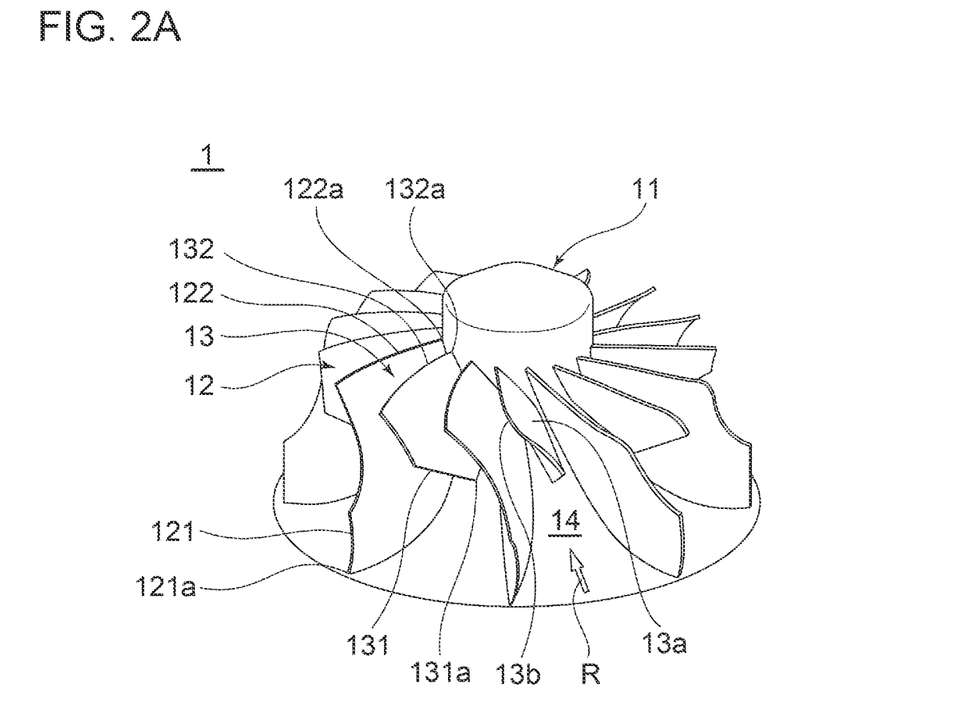
FIG. 2 is a diagram of a turbine impeller according to an embodiment of the present invention.
Figure 2B:
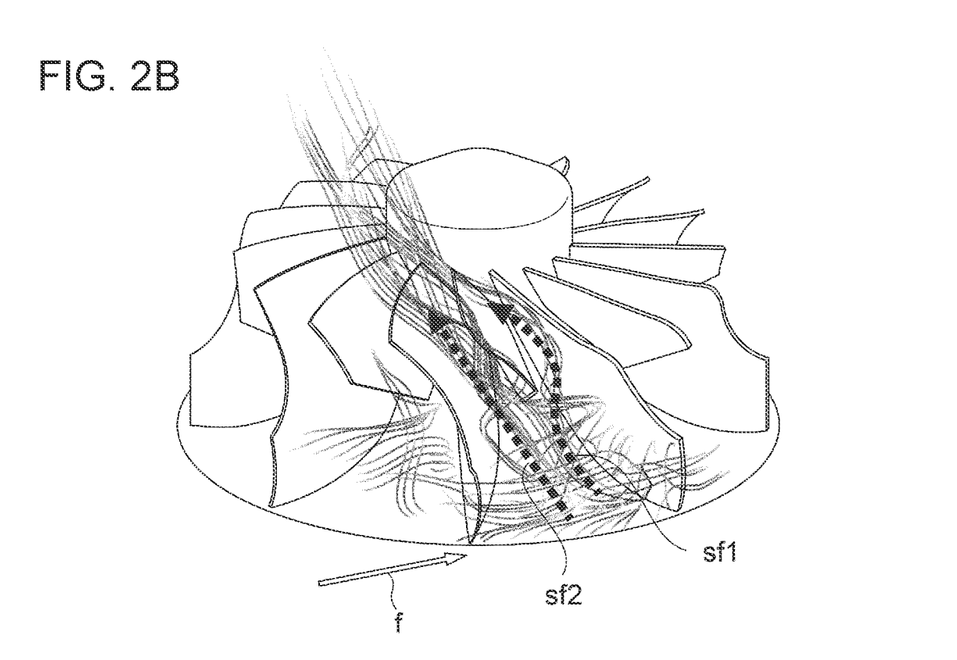

FIG. 2 is a diagram of a turbine impeller according to an embodiment of the present invention. FIG. 2A is a perspective view of the turbine impeller 1, and FIG. 2B is a diagram of a flow of a fluid that flows through the turbine impeller 1.

As depicted in FIG. 2, the turbine impeller 1 includes a hub portion 11 to be coupled to an end side of the rotational shaft 4, a plurality of main blades 12 disposed at intervals on the peripheral surface of the hub portion 11, and short blades 13 each of which is disposed between two adjacent main blades 12, 12 of the plurality of main blades 12. An inter-blade flow channel 14 is formed between two adjacent main blades 12, 12 as shown by arrow R in FIG. 2. A fluid flows through the inter-blade flow channel 14 from the outer side toward the inner side in the radial direction of the turbine impeller 1.

In the embodiment depicted in FIG. 2, one short blade 13 is disposed between two adjacent main blades 12, 12. Eight main blades 12 and eight short blades 13 are disposed alternately at regular intervals. However, the turbine impeller 1 according to an embodiment of the present invention is not limited to this example, and may have two or more short blades 13 between two adjacent main blades 12, 12. Further, for instance, the short blades 13 may be not necessarily disposed between every adjacent pair of main blades 12, 12. For instance, the short blades 13 may be provided between every other pair of main blades 12, 12.

Further, in the embodiment depicted in FIG. 1, the turbine housing 2 has, inside the turbine housing 2, a scroll flow path 21 formed on the radially outer side of the turbine impeller 1, and an outlet flow path 22 formed along the extending direction of the rotational axis K of the rotational shaft 4. The turbine housing 2 is coupled to the bearing housing 5 at the opposite side from the opening end of the outlet flow path 22. The bearing housing 5 houses a bearing 51 that supports the rotational shaft 4 rotatably.

FIGS. 3 to 7 are each a diagram showing the meridional shape of a turbine impeller according to an embodiment of the present invention.

As depicted in FIGS. 2, and 3 to 7, the turbine impeller 1 according to an embodiment of the present invention is configured such that a hub-side end 131a of a leading edge 131 of the short blade 13 is disposed on the inner side, in the radial direction, of a hub-side end 121a of a leading edge 121 of the main blade 12, in a meridional plane.

Figure 10A:
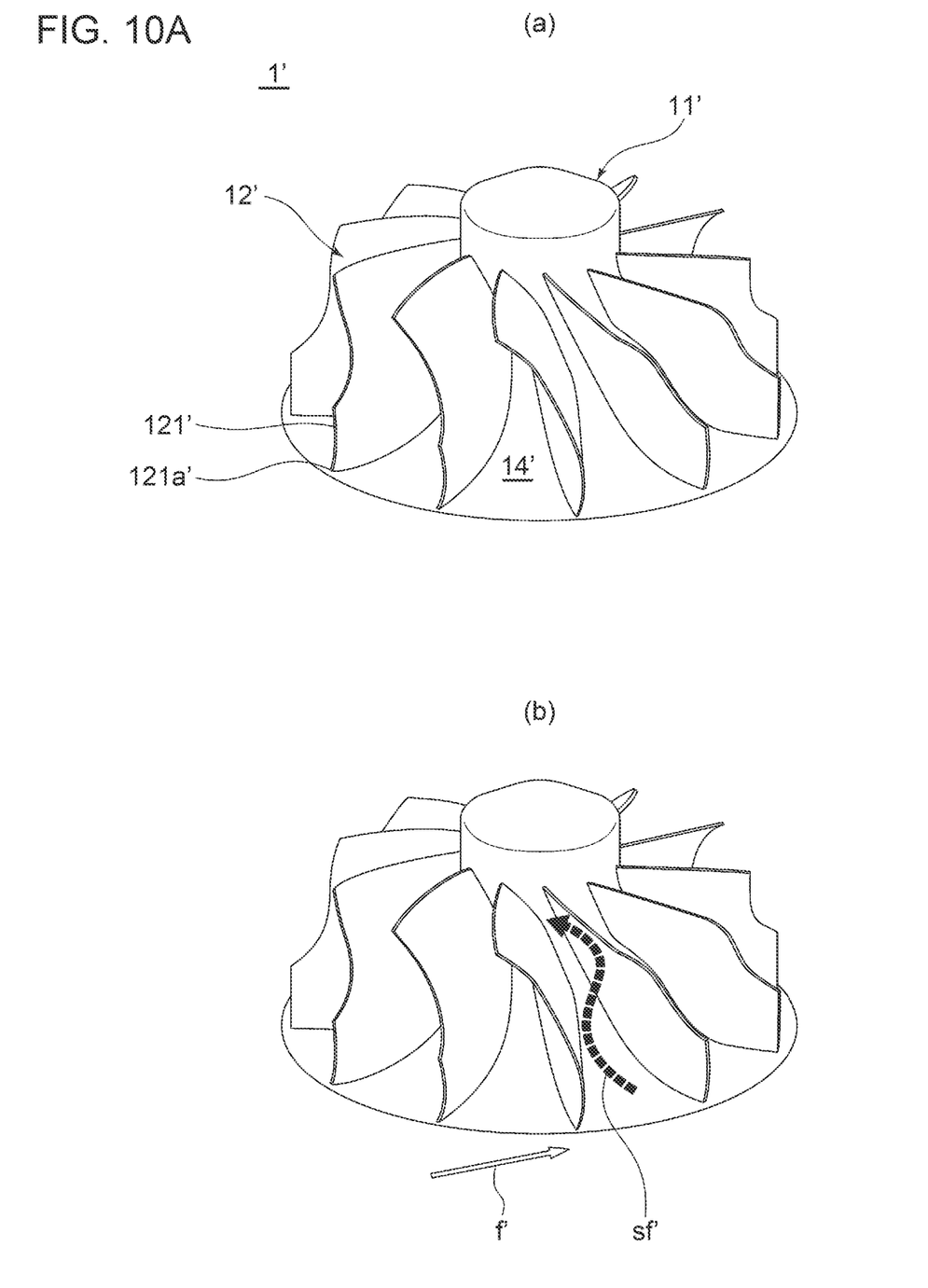
FIG. 10A is a diagram of a turbine impeller according to the first comparative example.
Figure 10B:
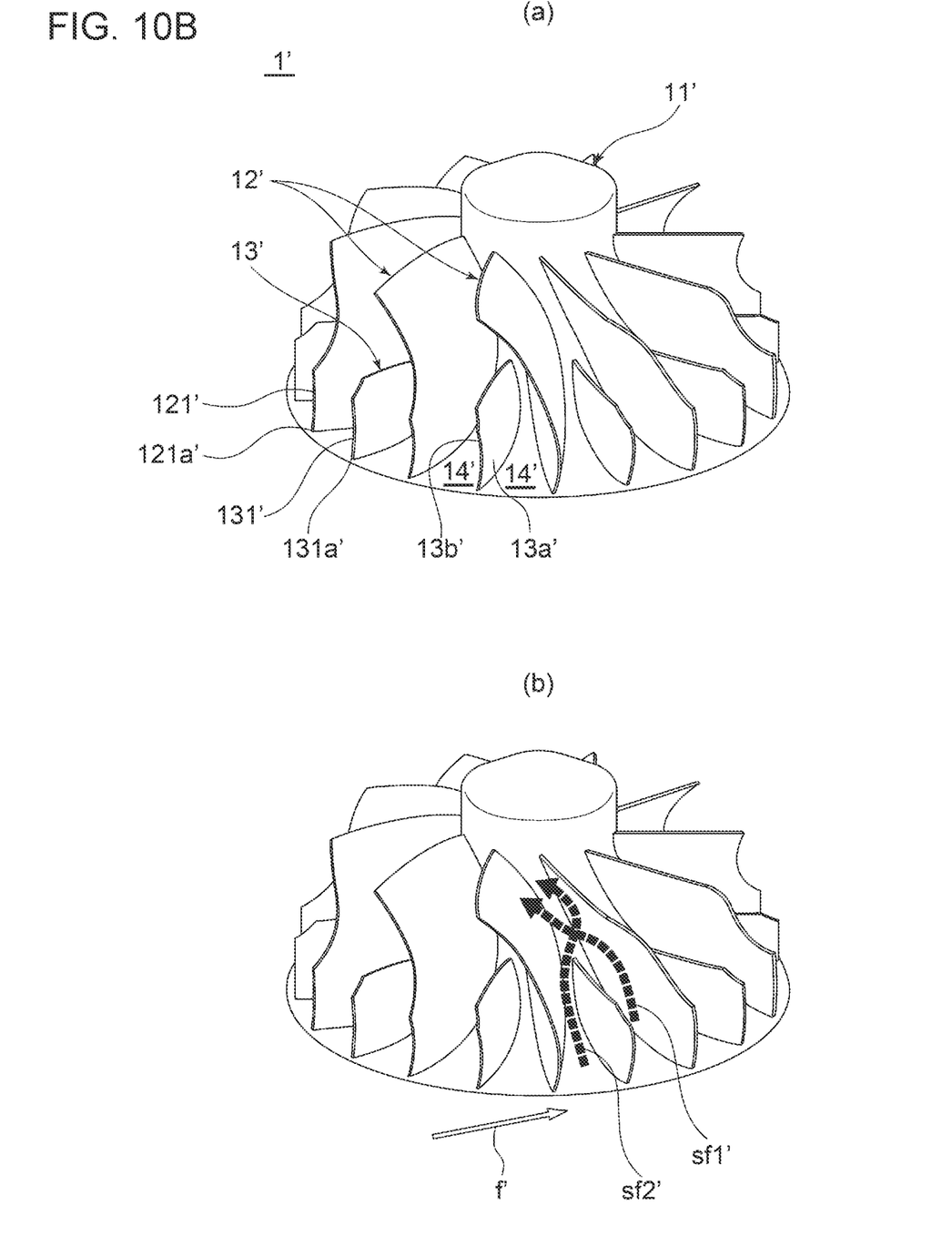
FIG. 10B is a diagram of a turbine impeller according to the second comparative example.

FIG. 10A is a diagram of a turbine impeller according to the first comparative example. FIG. 10A (a) is a perspective view of a turbine impeller 1', and FIG. 10A (b) is a diagram of a flow of a fluid that flows through the turbine impeller 1'. FIG. 10B is a diagram of a turbine impeller according to the second comparative example. FIG. 10B (a) is a perspective view of the turbine impeller 1', and FIG. 10B (b) is a diagram of a flow of a fluid that flows through the turbine impeller 1'.

A fluid that flows into the turbine impeller 1 from the scroll flow path 21 flows diagonally with respect to the leading edge 121 of the main blade 12, from the outer side toward the inner side, in the radial direction, of the turbine impeller 1, as shown by arrow f in FIG. 2B. Thus, as depicted in FIG. 10A, the fluid flowing into the turbine impeller 1' collides with the leading edge 121' of the main blade 12' and separates, thus causing loss. Further, according to findings of the present inventors, separation due to collision between the fluid flowing into the turbine impeller 1' and the leading edge 121' of the main blade 12' provokes a secondary flow sf' having a swirl component inside the inter-blade flow channel 14', and this secondary flow sf' also generates loss.

Further, according to findings of the present inventors, as depicted in FIG. 10B, the short blades 13' are disposed between two adjacent main blades 12', 12' so that the position of the leading edges 131' of the short blades 13' in the radial direction is the same as the position of the leading edges 121' of the main blades 12', and thereby it is possible to suppress separation at the leading edges 121' of the main blades 12' and at the leading edges 131' of the short blades 13'. However, the effect to reduce loss due to the secondary flow sf' flowing through the inter-blade flow channel 14' is limited. This is because, the secondary flow sf1' flowing between the main blade 12' and a surface 13a' (e.g. suction surface) of the short blade 13' collides with the secondary flow sf2' flowing between an adjacent main blade 12' and another surface 13b' (e.g. pressure surface) of the short blade 13', at the downstream side of the short blade 13' in the inter-blade flow channel 14', thus generating loss. Further, with the short blades 13' disposed on the outer section of the turbine impeller 1' in the radial direction, the inertia moment increases, and the transient responsiveness deteriorates.

In contrast, the turbine impeller 1 according to an embodiment of the present invention includes short blades 13 disposed between two adjacent main blades 2, and the hub-side ends 131a of the leading edges 131 of the short blades 13 are disposed on the inner side, in the radial direction, of the hub-side ends 121a of the leading edges 121 of the main blades 12, in a meridional plane. According to findings of the present inventors, with this configuration, it is possible to reduce loss due to the secondary flows sf1, sf2 that flow through the inter-blade flow channel 14 considerably, compared to the turbine impeller 1' of the second comparative example. Further, with the short blades 13 disposed on the inner section of the turbine impeller 1 in the radial direction, it is possible to suppress an increase in the inertia moment due to provision of the short blades 13, compared to the above described second example.

Moreover, with the turbine impeller 1 according to an embodiment of the present invention, the short blades 13 are disposed on the inner section of the turbine impeller 1 in the radial direction, and thereby it is possible to reduce the number of main blades compared to the turbine impeller 1' (FIG. 10A) of the first comparative example having no short blades, and to the turbine impeller 1' (FIG. 10B) of the second comparative example having the short blades 13' on the outer section in the radial direction. While the turbine impeller 1 has eight main blades 12 and eight short blades 13 in the embodiment depicted in FIG. 2, the turbine impeller 1' has eleven main blades 12' in the first comparative example. In the second comparative example, the turbine impeller 1' has ten main blades 12' and ten short blades 13'. With the short blades 13 disposed on the inner section of the turbine impeller 1 in the radial direction, the short blades 13 cross the minimum width section of the inter-blade flow channels 14. Thus, to optimize the throat width of the minimum-width portion (throat portion) between the main blades 12 and the short blades 13, the number of the main blades 12 is reduced.

Accordingly, with the turbine impeller 1 according to an embodiment of the present invention, while greater loss is generated due to separation at the leading edge 121 of each main blade 12, it is possible to suppress loss due to separation at the leading edges 121 of the main blades 12 for the turbine impeller 1 as a whole. Further, the inertia moment can be reduced by reducing the number of the main blades 12.

As depicted in FIGS. 2, and 3 to 7, in some embodiments, the hub-side ends 132a of the trailing edges 132 of the short blades 13 of the turbine impeller 1 are disposed, in a meridional plane, on the same position in the axial direction as the hub-side ends 122a of the trailing edges 122 of the main blades 12, or are disposed downstream of the hub-side ends 122a of the trailing edges 122 of the main blades 12 with respect to the flow direction of the fluid (closer to the tip of the hub portion 11 in the axial direction).

Figure 3:
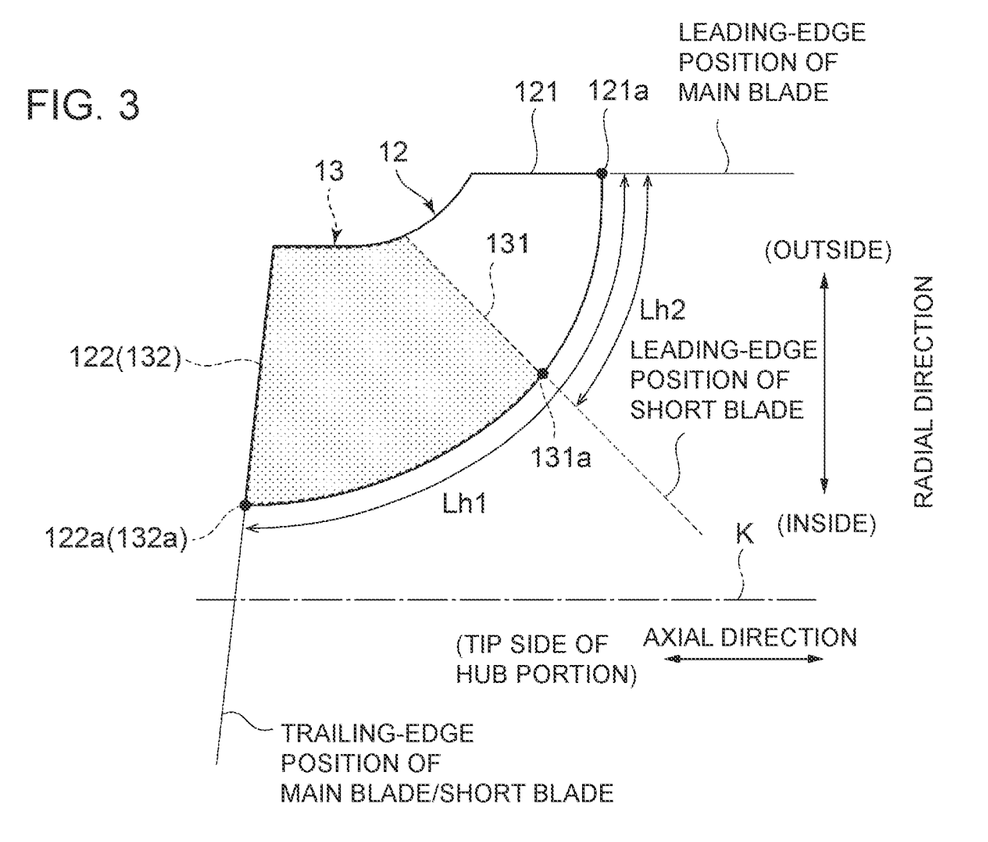
FIG. 3 is a diagram showing the meridional shape of a turbine impeller according to an embodiment of the present invention.
Figure 5:
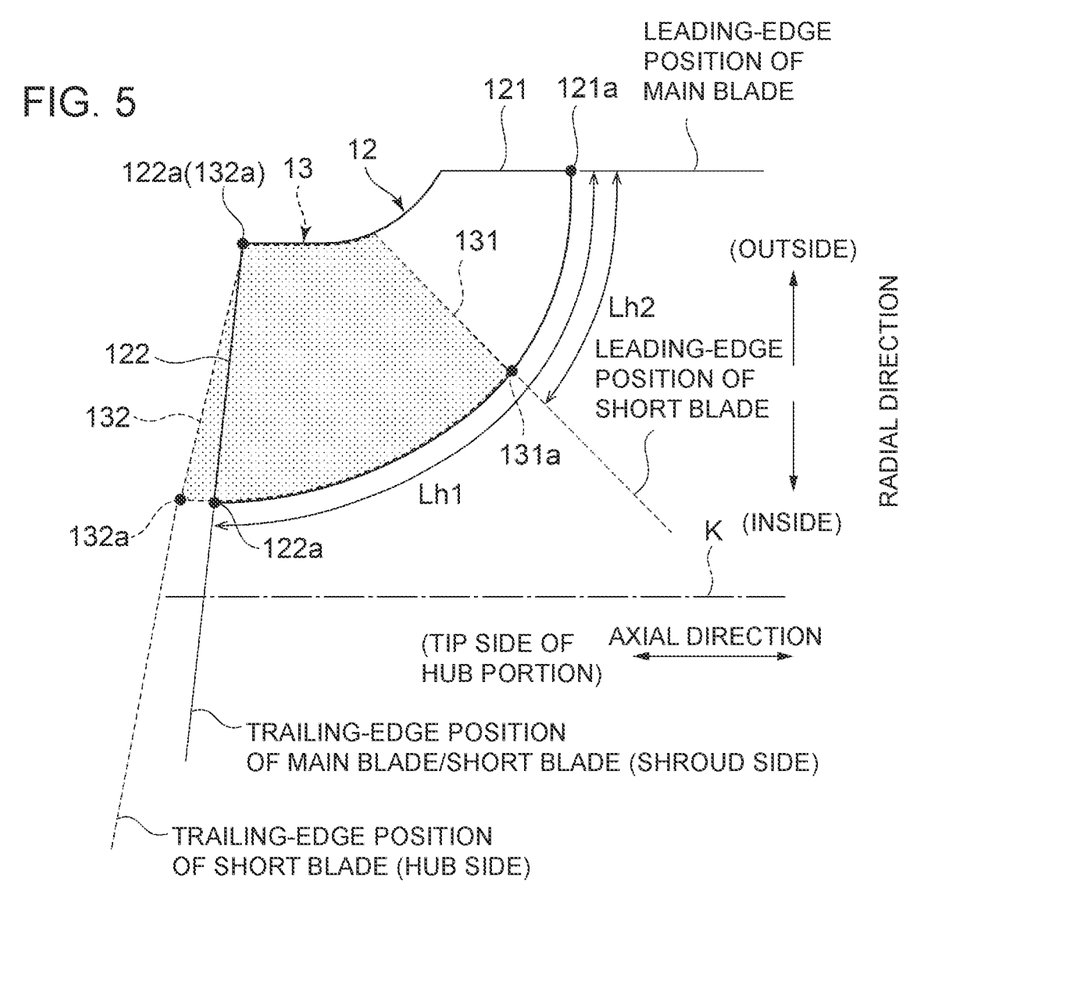
FIG. 5 is a diagram showing the meridional shape of a turbine impeller according to an embodiment of the present invention.
Figure 6:
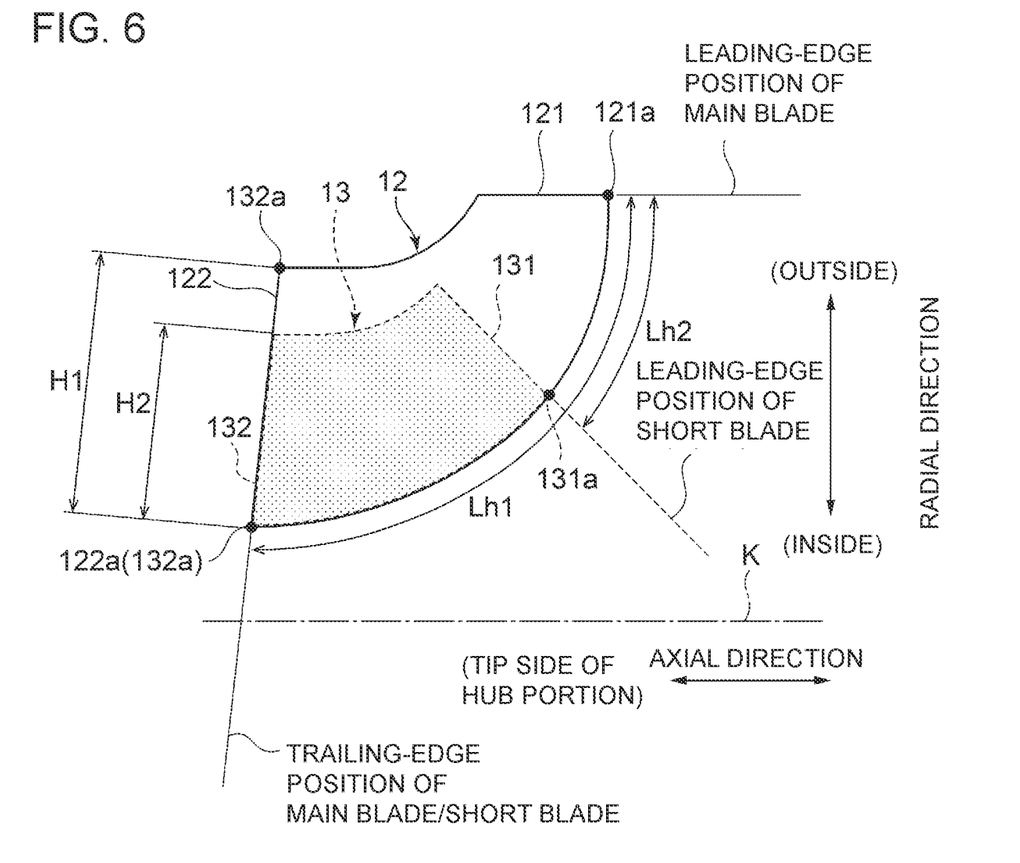
FIG. 6 is a diagram showing the meridional shape of a turbine impeller according to an embodiment of the present invention.

In the embodiment depicted in FIGS. 2, 3 and 6, the hub-side ends 132a of the trailing edges 132 of the short blades 13 of the turbine impeller 1 are disposed on the same position in the axial direction as the hub-side ends 122a of the trailing edges 122 of the main blades 12, in a meridional plane. In the embodiment depicted in FIGS. 4, 5 and 7, the hub-side ends 132a of the trailing edges 132 of the short blades 13 of the turbine impeller 1 are disposed closer to the tip of the hub portion 11 in the axial direction than the hub-side ends 122a of the trailing edges 122 of the main blades 12, in a meridional plane.

According to the above embodiments, it is possible to prevent collision, inside the inter-blade flow channel 14, of the secondary flow sf1 flowing between the main blade 12 and a surface 13a of the short blade 13 and the secondary flow sf2 flowing between an adjacent main blade 12 and another surface 13b of the short blade 13. Accordingly, it is possible to reduce the loss due to the secondary flows sf1, sf2 that flow through the inter-blade flow channel 14.

Figure 8A:
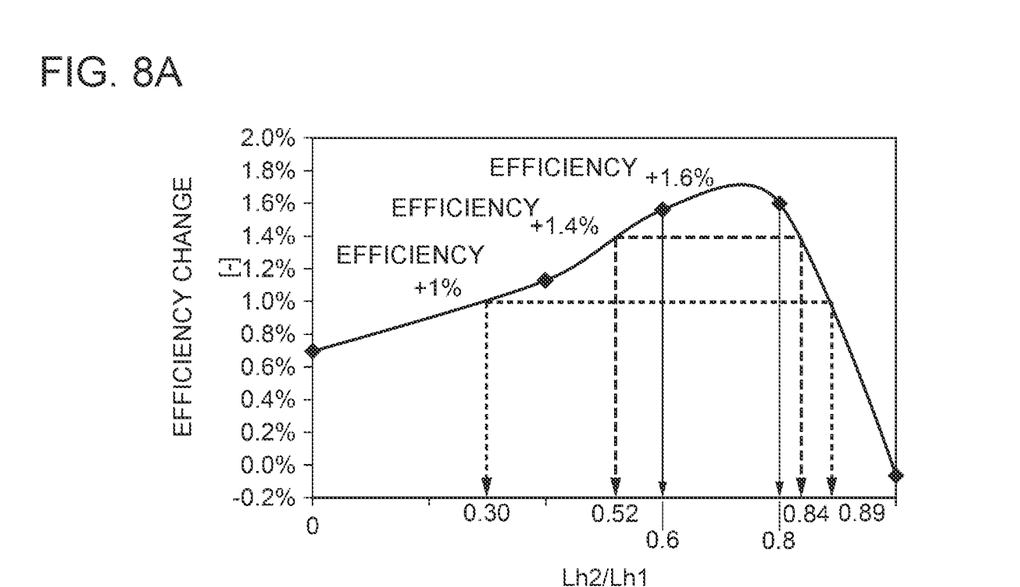
FIG. 8A is a chart showing the relationship between the leading-edge position of a short blade of a turbine impeller and the turbine efficiency, according to an embodiment of the present invention.
Figure 8B:
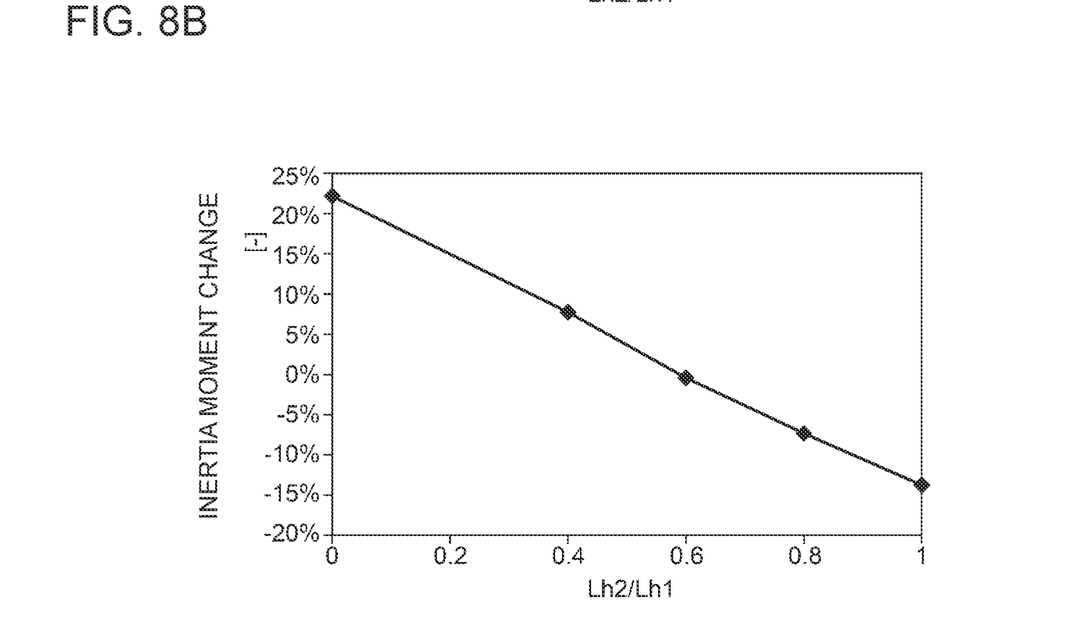
FIG. 8B is a chart showing the relationship between the leading-edge position of a short blade of a turbine impeller and the inertia moment, according to an embodiment of the present invention.

FIG. 8A is a chart showing the relationship between the leading-edge position of a short blade of a turbine impeller and the turbine efficiency, according to an embodiment of the present invention. FIG. 8B is a chart showing the relationship between the leading-edge position of a short blade of a turbine impeller and the inertia moment, according to an embodiment of the present invention. In FIGS. 8A and 8B, the x-axis is a ratio of Lh2 to Lh1 (Lh2/Lh1), provided that, in a meridional plane, Lh1 is a distance from the hub-side end 121a of the leading edge 121 of the main blade 12 to the hub-side end 122a of the trailing edge 122 of the main blade 12, and Lh2 is a distance from the hub-side end 121a of the leading edge 121 of the main blade 12 to the hub-side end 131a of the leading edge 131 of the short blade 13. The y-axis in FIG. 8A is a change in the turbine efficiency with respect to a reference turbine impeller. The y-axis in FIG. 8B is a change in the inertia moment with respect to a reference turbine impeller.

In the present embodiment, as depicted in FIGS. 8A and 8B, changes in the turbine efficiency and in the inertia moment, when Lh2/Lh1 is changed from "0" to "0.2", "0.4", "0.6", "0.8", "1", are analyzed and approximate curves of the changes are obtained. In the present embodiment, the turbine impeller includes eight main blades and eight short blades. If Lh2/Lh1 of the x-axis is "0" in FIGS. 8A and 8B, the turbine impeller includes only the main blades, corresponding to the turbine impeller having sixteen main blades only. If Lh2/Lh1 of the x-axis is "1", the turbine impeller includes no short blades, and corresponds to a turbine impeller having eight main blades alone. Further, in the present embodiment, the above mentioned reference turbine impeller is the turbine impeller 1' having eleven main blades alone, depicted in FIG. 10A. Further, the blade height of the short blades is the same as the blade height of the main blades. Further, while computation fluid dynamics (CFD) is used for the analysis in the present embodiment, the method for the analysis is not particularly limited to CFD.

As depicted in FIG. 8A, if the hub-side end 121a of the leading edge 121 of the main blade 12 and the hub-side end 131a of the leading edge 131 of the short blade 13 are at a small distance (if Lh1/Lh1 is small), the turbine efficiency does not improve much. This may be because, if the distance from the hub-side end 121a of the leading edge 121 of the main blade 12 to the hub-side end 131a of the leading edge 131 of the short blade 13 is too close, a separation flow caused by collision with the leading edge 121 of the main blade 12 hits the leading edge 131 of the short blade 13, thus generating loss. On the other hand, as shown in FIG. 8B, if the distance between the hub-side end 121a of the leading edge 121 of the main blade 12 and the hub-side end 131a of the leading edge 131 of the short blade 13 is too great (if Lh2/Lh1 is close to 1), the loss due to the secondary flows sf1, sf2 through the inter-blade flow channel 14 cannot be sufficiently suppressed.

The present inventors found that, as depicted in FIG. 8A, with the hub-side end 131a of the leading edge 131 of the short blade 13 being disposed in a region satisfying an expression 0.30<Lh2/Lh1<0.89, it is possible to reduce the loss due to the secondary flows sf1, sf2 flowing through the inter-blade flow channel 14, and to improve the turbine efficiency by at least 1% compared to the reference turbine impeller 1' having only the above described eleven main blades.

Furthermore, as depicted in FIG. 8A, the present inventors found that, with the hub-side end 131a of the leading edge 131 of the short blade 13 being disposed in a region satisfying an expression 0.52<Lh2/Lh1<0.84, it is possible to improve the turbine efficiency by at least 1.4% compared to the above mentioned turbine impeller 1'.

Furthermore, as depicted in FIG. 8A, the present inventors found that, with the hub-side end 131a of the leading edge 131 of the short blade 13 being disposed in a region satisfying an expression 0.60<Lh2/Lh1<0.80, it is possible to improve the turbine efficiency by at least 1.6% compared to the above mentioned turbine impeller 1'.

Figure 4:
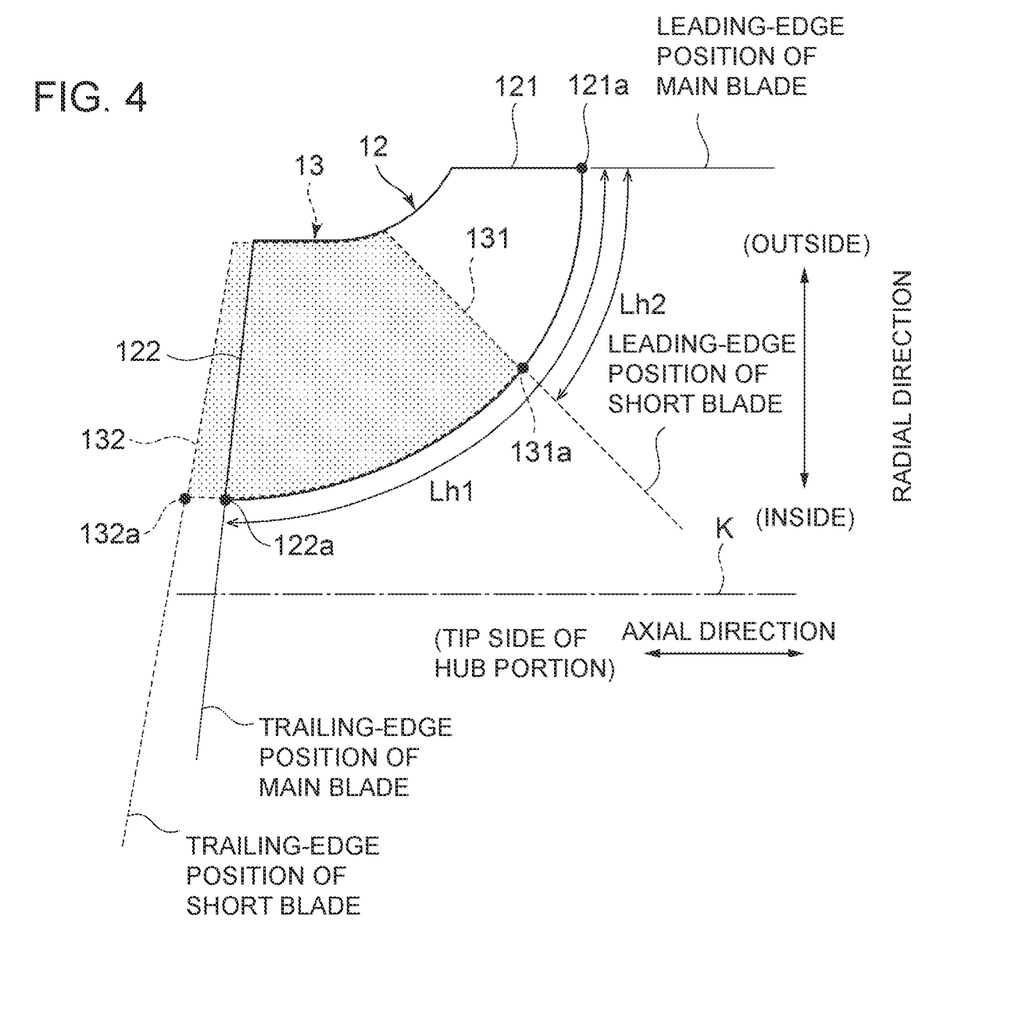
FIG. 4 is a diagram showing the meridional shape of a turbine impeller according to an embodiment of the present invention.
Figure 7:
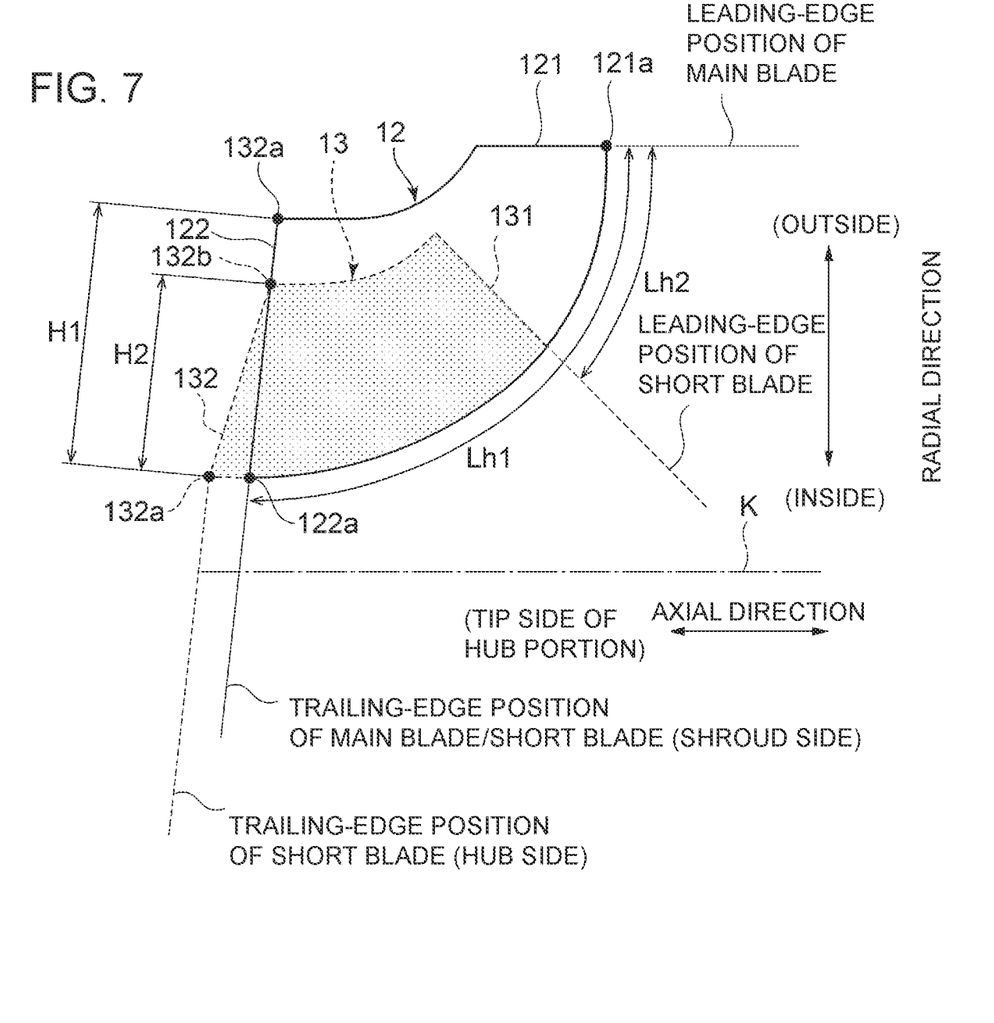
FIG. 7 is a diagram showing the meridional shape of a turbine impeller according to an embodiment of the present invention.

In some embodiments, as depicted in FIGS. 4, 5, and 7, the hub-side end 131a of the trailing edge 131 of the short blade 13 is disposed downstream with respect to the flow direction of the fluid (on the inner section in the radial direction) of the hub-side end 122a of the trailing edge 122 of the main blade 12.

According to this embodiment, it is possible to shift the position of collision between the secondary flow sf1 flowing between the main blade 12 and the surface 13a of the short blade 13 and the secondary flow sf2 flowing between the adjacent main blade 12 and the other surface 13b of the short blade 13, to the downstream side away from the trailing edge 122 of the main blade 12. Accordingly, it is possible to further suppress the loss due to the secondary flows sf1, sf2 that flow through the inter-blade flow channel 14.

As depicted in FIGS. 5 and 7, in some embodiments, the shroud-side end 132b of the trailing edge 132 of the short blade 13 is disposed on the trailing edge 122 of the main blade 12, in a meridional plane.

The effect in this embodiment, which is to shift the position of collision between the secondary flow sf1 flowing between the main blade 12 and the surface 13a of the short blade 13 and the secondary flow sf2 flowing between the adjacent main blade 12 and the other surface 13b of the short blade 13 to the downstream side away from the trailing edge 122 of the main blade 12, is greater at the hub-side portion than at the shroud-side portion of the short blade 13. Thus, with the above embodiment, compared to a case in which the entire trailing edge 132 of the short blade 13 is disposed downstream of the trailing edge 122 of the main blade 12 (FIG. 4), it is possible to reduce the size of the short blade 13 and thereby to reduce the inertia moment, while reducing the loss due to the secondary flows sf1, sf2.

As depicted in FIGS. 6 and 7, in some embodiments, the blade height H2 of the short blade 13 is smaller than the blade height H1 of the main blade 12.

As described above, the effect of providing the short blade 13 to reduce the loss due to the secondary flows sf1, sf2 flowing through the inter-blade flow channel 14 is greater at the hub-side portion than at the shroud portion of the short blade 13. Thus, with the above embodiment, the blade height H2 of the short blade 13 is smaller than the blade height H1 of the main blade 12, and thereby it is possible to reduce the inertia moment while reducing the loss due to the secondary flows sf1, sf2.

In some embodiments, the blade height H2 of the short blade 13 is within a range expressed by ⅓H1≤H2<⅔H1. Thus, with the above embodiment, it is possible to reduce the inertia moment suitably while reducing the loss due to the secondary flows sf1, sf2.

As depicted in FIG. 1, in some embodiments, the variable geometry turbine 10 according to an embodiment of the present invention includes the turbine housing 2 housing the turbine impeller 1, and the variable nozzle mechanism 3 for controlling the flow direction of the fluid that flows toward the turbine impeller 1.

In the embodiment depicted in FIG. 1, the variable nozzle mechanism 3 includes a nozzle mount 31, a nozzle plate 32, a nozzle support 33, and a nozzle vane 34. The nozzle mount 31 is a disc-shaped member having an opening in the center. The outer circumferential portion of the nozzle mount 31 is nipped by the turbine housing 2 and the bearing housing 5, and thereby the nozzle mount 31 is fixed between the turbine housing 2 and the bearing housing 5. The nozzle plate 32 is a disc-shaped member having an opening in the center, and is fixed to the shroud portion 23 of the turbine housing 2 in a position facing the nozzle mount 31. The nozzle mount 31 and the nozzle plate 32 are coupled by a plurality of nozzle supports 33. A plurality of nozzle vanes 34 is disposed at intervals in the circumferential direction between the nozzle mount 31 and the nozzle plate 32. A nozzle flow path 34a is formed between adjacent nozzle vanes 34, 34. The nozzle vanes 34 are configured such that the vane angle of the nozzle vanes 34 changes as a drive mechanism 36 drives nozzle shafts 35 to revolve about the axis.

Figure 9A:
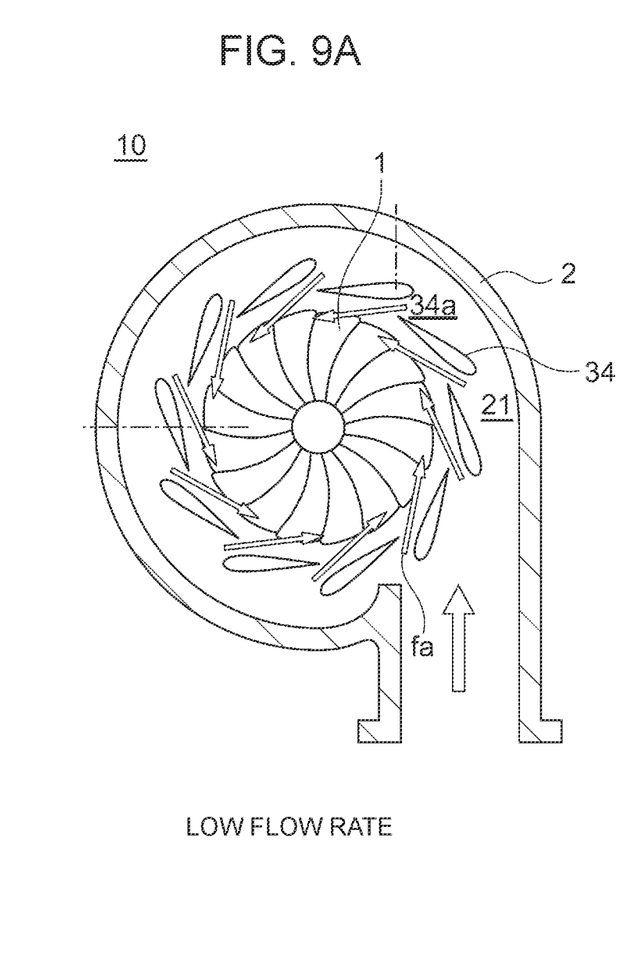
FIG. 9 is an explanatory diagram for describing a flow of a fluid at a high flow rate and at a low flow rate, in a variable geometry turbine according to an embodiment of the present invention.
Figure 9B:
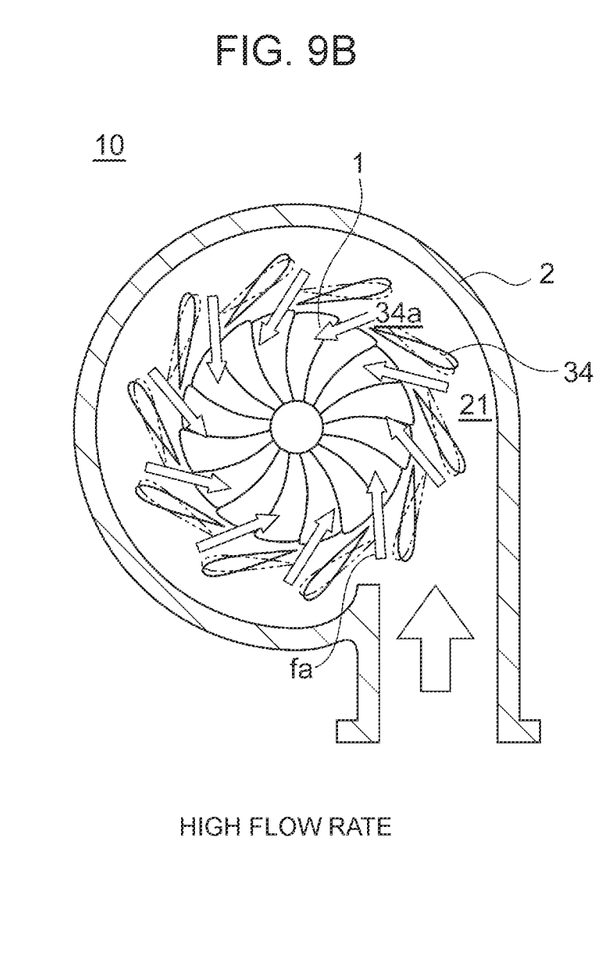

FIG. 9 is an explanatory diagram for describing a flow of a fluid at a high flow rate and at a low flow rate, in a variable geometry turbine according to an embodiment of the present invention. When the flow rate is high as depicted in FIG. 9B, each of the plurality of nozzle vanes 34 revolves in a direction that widens the nozzle flow path 34a formed between two adjacent nozzle vanes 34. When the flow rate is low as depicted in FIG. 9A, each of the plurality of nozzle vanes 34 revolves in a direction that narrows the nozzle flow path 34a formed between two adjacent nozzle vanes 34. The flow directions fa, fb of the fluid flowing into the turbine impeller 1 form smaller angles with the tangent direction of the turbine impeller 1 when the flow rate is low (fa) than when the flow rate is high (fb). Thus, the loss due to separation caused by collision of the fluid flowing into the turbine impeller 1 with the leading edge 121 of the main blade 12 has a greater effect when the flow rate is low than when the flow rate is high.

Thus, with the variable geometry turbine 10 being provided with the above described turbine impeller 1, it is possible to improve the turbine efficiency when the flow rate is low.

The embodiments of the present invention have been described above. However, the present invention is not limited thereto, and various modifications may be applied as long as they do not depart from the object of the present invention.

For instance, while the variable geometry turbine 10 in FIG. 1 is a radial turbine in which the fluid flows into the turbine impeller 1 in the radial direction, the variable geometry turbine 10 according to an embodiment of the present invention is not limited to this, and may be configured as a mixed flow turbine in which the fluid flows into the turbine impeller 1 in a diagonal direction.

DESCRIPTION OF REFERENCE NUMERALS

1 Turbine impeller
2 Turbine housing
3 Variable nozzle mechanism
4 Rotational shaft
5 Bearing housing
10 Variable geometry turbine
11 Hub portion
12 Main blade
121 Leading edge of main blade
121a Hub-side end of leading edge of main blade
122 Trailing edge of main blade
122a Hub-side end of trailing edge of main blade
13 Short blade
131 Leading edge of short blade
131a Hub-side end of leading edge of short blade
132 Trailing edge of short blade
132a Hub-side end of trailing edge of short blade
132b Shroud-side end of trailing edge of short blade
13a Surface of short blade
13b Another surface of short blade
14 Inter-blade flow channel
21 Scroll flow path
22 Outlet flow path
23 Shroud portion
31 Nozzle mount
32 Nozzle plate
33 Nozzle support
34 Nozzle vane
34a Nozzle flow path
36 Drive mechanism
51 Bearing

The invention claimed is:

1. A turbine impeller, comprising:
a hub portion coupled to an end of a rotational shaft;
a plurality of main blades disposed at intervals on a peripheral surface of the hub portion; and
a short blade disposed between two adjacent main blades among the plurality of main blades,
wherein an inter-blade flow channel is formed between the two adjacent main blades so that a fluid flows through the inter-blade flow channel from an outer side toward an inner side of the turbine impeller in a radial direction,
wherein a hub-side end of a leading edge of the short blade is disposed on an inner side, in the radial direction, of a hub-side end of a leading edge of the main blade, in a meridional plane, and
wherein, in the meridional plane, a hub-side end of a trailing edge of the short blade is positioned on a same position, in an axial direction, as a hub-side end of a trailing edge of the main blade, or the hub-side end of the trailing edge of the short blade is positioned downstream, in the flow direction of the fluid, of the hub-side end of the trailing edge of the main blade.

2. The turbine impeller according to claim 1,
wherein the hub-side end of the leading edge of the short blade is positioned in a region which satisfies $0.30<Lh2/Lh1<0.89$, provided that $Lh1$ is a distance from the hub-side end of the leading edge of the main blade to the hub-side end of the trailing edge of the main blade in the meridional plane, and $Lh2$ is a distance from the hub-side end of the leading edge of the main blade to the hub-side end of the leading edge of the short blade in the meridional plane.

3. The turbine impeller according to claim 2,
wherein the hub-side end of the leading edge of the short blade is positioned in a region which satisfies $0.52<Lh2/Lh1<0.84$.

4. The turbine impeller according to claim 3,
wherein the hub-side end of the leading edge of the short blade is positioned in a region which satisfies $0.60<Lh2/Lh1<0.80$.

5. The turbine impeller according to claim 1,
wherein a shroud-side end of the trailing edge of the short blade is positioned on the trailing edge of the main blade in the meridional plane.

6. The turbine impeller according to claim 1,
wherein a blade height of the short blade is lower than a blade height of the main blade.

7. A variable geometry turbine, comprising:
the turbine according to claim 1,
a turbine housing for housing the turbine impeller; and
a variable nozzle mechanism for controlling a flow direction of a fluid which flows toward the turbine impeller.

8. A turbine impeller, comprising:
a hub portion coupled to an end of a rotational shaft;
a plurality of main blades disposed at intervals on a peripheral surface of the hub portion; and
a short blade disposed between two adjacent main blades among the plurality of main blades,
wherein an inter-blade flow channel is formed between the two adjacent main blades so that a fluid flows through the inter-blade flow channel from an outer side toward an inner side of the turbine impeller in a radial direction, wherein, in a meridional plane, a hub-side end of a leading edge of the short blade is disposed on an inner side, in the radial direction, of a hub-side end of a leading edge of the main blade, wherein, in the meridional plane, a hub-side end of a trailing edge of the short blade is positioned on a same position, in an axial direction, as a hub-side end of a trailing edge of the main blade, or positioned downstream, in a flow direction of the fluid, of the hub-side end of the trailing edge of the main blade, and wherein the hub-side end of the leading edge of the short blade is positioned in a region which satisfies $0.30 < Lh2/Lh1 < 0.89$, provided that $Lh1$ is a distance from the hub-side end of the leading edge of the main blade to the hub-side end of the trailing edge of the main blade in the meridional plane, and $Lh2$ is a distance from the hub-side end of the leading edge of the main blade to the hub-side end of the leading edge of the short blade in the meridional plane.

9. A turbine impeller, comprising:

a hub portion coupled to an end of a rotational shaft;

a plurality of main blades disposed at intervals on a peripheral surface of the hub portion; and a short blade disposed between two adjacent main blades among the plurality of main blades, wherein an inter-blade flow channel is formed between the two adjacent main blades so that a fluid flows through the inter-blade flow channel from an outer side toward an inner side of the turbine impeller in a radial direction, wherein, in a meridional plane, a hub-side end of a leading edge of the short blade is disposed on an inner side, in the radial direction, of a hub-side end of a leading edge of the main blade, wherein, in the meridional plane, a hub-side end of a trailing edge of the short blade is positioned on a same position, in an axial direction, as a hub-side end of a trailing edge of the main blade, or positioned downstream, in a flow direction of the fluid, of the hub-side end of the trailing edge of the main blade, and wherein a shroud-side end of the trailing edge of the short blade is positioned on the trailing edge of the main blade in the meridional plane.

* * * * *